United States Patent
Li et al.

(10) Patent No.: US 8,929,607 B2
(45) Date of Patent: Jan. 6, 2015

(54) SYSTEM AND METHOD FOR PERFORMING DEPTH ESTIMATION UTILIZING DEFOCUSED PILLBOX IMAGES

(75) Inventors: Pingshan Li, Sunnyvale, CA (US); Kensuke Miyagi, Sunnyvale, CA (US); Florian Ciurea, San Jose, CA (US); Tomonori Shuda, Tokyo (JP)

(73) Assignee: Sony Corporation, Tokyo (JP)

( * ) Notice: Subject to any disclaimer, the term of this patent is extended or adjusted under 35 U.S.C. 154(b) by 300 days.

(21) Appl. No.: 13/426,828

(22) Filed: Mar. 22, 2012

(65) Prior Publication Data

US 2013/0142394 A1 Jun. 6, 2013

Related U.S. Application Data

(60) Provisional application No. 61/565,790, filed on Dec. 1, 2011.

(51) Int. Cl.
*G06K 9/00* (2006.01)

(52) U.S. Cl.
USPC .......................................................... 382/106

(58) Field of Classification Search
None
See application file for complete search history.

(56) References Cited

U.S. PATENT DOCUMENTS

| | | | |
|---|---|---|---|
| 7,929,801 B2 | 4/2011 | Nakamura et al. | |
| 8,045,046 B1 * | 10/2011 | Li et al. | 348/349 |
| 2003/0053667 A1 * | 3/2003 | Paragios et al. | 382/128 |
| 2007/0019883 A1 * | 1/2007 | Wong et al. | 382/276 |
| 2007/0036427 A1 * | 2/2007 | Nakamura et al. | 382/154 |
| 2007/0297784 A1 * | 12/2007 | Wong et al. | 396/89 |
| 2009/0040342 A1 * | 2/2009 | Drimbarean et al. | 348/241 |
| 2009/0268985 A1 * | 10/2009 | Wong et al. | 382/299 |
| 2010/0008574 A1 | 1/2010 | Ishiga | |
| 2010/0033618 A1 * | 2/2010 | Wong et al. | 348/347 |
| 2010/0080482 A1 * | 4/2010 | Wong et al. | 382/255 |
| 2010/0194971 A1 | 8/2010 | Li et al. | |
| 2011/0279699 A1 * | 11/2011 | Matsui | 348/222.1 |
| 2012/0033094 A1 * | 2/2012 | Ishii et al. | 348/208.6 |

FOREIGN PATENT DOCUMENTS

| | | |
|---|---|---|
| JP | 2001-159159 A | 8/2011 |
| WO | WO 2011/084279 A2 | 7/2011 |

OTHER PUBLICATIONS

N. Intrator, N. Neretti, T. Nguyen, Y. Chen, Q. Huynh, R. Coifman, I. Cohen, An Integrated Approach to Pattern Recognition, Brown University, Boston University, Navsea, Yale University, Office of Naval Research, www.physics.brown.edu/physics/userpages/faculty/Nathan_Intrator/darpa/index.html, Aug./Sep. 2000, 1-74 pgs.
Imaging Solution, (Online) Sep. 15, 2008, URL: http://imagingsolution.blog107.fc2.com/blog-entry-88.html, pp. 1-3.
Yasuyuki Suga, Image Processing Program Using TEO Library, A Beginner's Guide, http://www.iim.ics.tut.ac.jp/~sugaya/books/TeoProgrammingGuide/ref/pg_0073.pdf, Mar. 22, 2006, p. 64.

* cited by examiner

*Primary Examiner* — Stephen R Koziol
*Assistant Examiner* — Delomia Gilliard
(74) *Attorney, Agent, or Firm* — Gregory J. Koerner; Redwood Patent Law (57) ABSTRACT

A system and method for performing a depth estimation procedure utilizing defocused pillbox images includes a camera device with a sensor device for capturing pillbox blur images of a photographic target. The camera utilizes a depth estimator for performing a Gaussianization procedure that transforms the pillbox blur images into corresponding Gaussian blur images. The Gaussianization procedure is performed by convolving the pillbox blur images with a Gaussianization kernel to generate the corresponding Gaussian blur images. The depth estimator then utilizes the Gaussian blur images for effectively performing the depth estimation procedure.

20 Claims, 13 Drawing Sheets

SYSTEM AND METHOD FOR PERFORMING DEPTH ESTIMATION UTILIZING DEFOCUSED PILLBOX IMAGES

CROSS-REFERENCE TO RELATED APPLICATIONS

This application is related to, and claims priority in, U.S. Provisional Patent Application No. 61/565,790, entitled "Depth Estimation From Two Defocused Images Under Various Lighting Conditions," filed on Dec. 1, 2011. The foregoing related application is commonly assigned, and is hereby incorporated by reference.

BACKGROUND SECTION

1. Field of the Invention

This invention relates generally to techniques for analyzing image data, and relates more particularly to a system and method for performing a depth estimation procedure utilizing defocused pillbox images.

2. Description of the Background Art

Implementing efficient methods for analyzing image data is a significant consideration for designers and manufacturers of contemporary electronic devices. However, efficiently analyzing image data with electronic devices may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced device capability to perform various advanced operations may provide additional benefits to a system user, but may also place increased demands on the control and management of various device components. For example, an enhanced electronic device that effectively analyzes digital image data may benefit from an effective implementation because of the large amount and complexity of the digital data involved.

Due to growing demands on system resources and substantially increasing data magnitudes, it is apparent that developing new techniques for analyzing image data is a matter of concern for related electronic technologies. Therefore, for all the foregoing reasons, developing effective systems for analyzing image data remains a significant consideration for designers, manufacturers, and users of contemporary electronic devices.

SUMMARY

In accordance with the present invention, a system and method for performing a depth estimation procedure by utilizing defocused pillbox images is disclosed. In one embodiment, a camera initially captures a defocused pillbox image1. The focus setting of the camera is then changed. For example, the focus setting may be adjusted to decrease the focus of the camera by one depth-of-field. The camera then captures a defocused pillbox image2 that is more blurry (out of focus) than previously captured pillbox image1.

A depth estimator or other appropriate entity selects an appropriate kernel K for performing a convolution procedure. The kernel K may be configured in any appropriate manner. For example, in certain embodiments, kernel K may be configured as a 3-by-3 Gaussian kernel with a small variance. The depth estimator also selects an appropriate Gaussianization kernel for performing a Gaussianization procedure in accordance with the present invention. The Gaussianization kernel may be implemented and utilized in any appropriate manner. For example, the Gaussianization kernel may be a Gaussian function or a more general blur function with a limited mean and variance.

Next, the depth estimator computes the matching error between image1 and image2, and then performs a convolution procedure to create a new current image1 that is equal to the immediately-preceding image1 convolved with the selected kernel K. The depth estimator computes the matching error between the current image1 and image2, and determines whether current image1 and image2 match. If the two images do not match, then the process returns to perform additional convolution iterations in a similar manner.

However, if image1 and image2 match, then the depth estimator performs a Gaussianization procedure on both the current image1 and image2 by utilizing the previously-selected Gaussianization kernel to convert the non-Gaussian blur images into corresponding Gaussian blur images. In particular, the depth estimator performs a convolution procedure to create a new current Gaussian image1 that is equal to the immediately-preceding pillbox blur image1 convolved with the selected Gaussianization kernel. In addition, the depth estimator performs a convolution procedure to create a new current Gaussian image2 that is equal to the immediately-preceding pillbox blur image2 convolved with the selected Gaussianization kernel.

The depth estimator then performs a convolution procedure to create a new current Gaussian image1 that is equal to the immediately-preceding Gaussian image1 convolved with the selected kernel K. The depth estimator computes the matching error between the current Gaussian image1 and Gaussian image2, and determines whether current Gaussian image1 and Gaussian image2 match. If the two images do not match, then the process returns to perform additional iterations. However, if the current Gaussian image1 and Gaussian image2 match, then the process may terminate. The present invention therefore provides an improved system and method for performing a depth estimation procedure by utilizing defocused pillbox images.

DETAILED DESCRIPTION

The present invention relates to an improvement in image data analysis techniques. The following description is presented to enable one of ordinary skill in the art to make and use the invention and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for performing a depth estimation procedure by utilizing defocused pillbox images, and includes a camera device with a sensor device for capturing pillbox blur images of a photographic target. The camera utilizes a depth estimator for performing a Gaussianization procedure that transforms the pillbox blur images into corresponding Gaussian blur images. The Gaussianization procedure is performed by convolving the pillbox blur images with a Gaussianization kernel to generate the corresponding Gaussian blur images. The depth estimator then utilizes the Gaussian blur images for effectively performing the depth estimation procedure.

Figure 1:
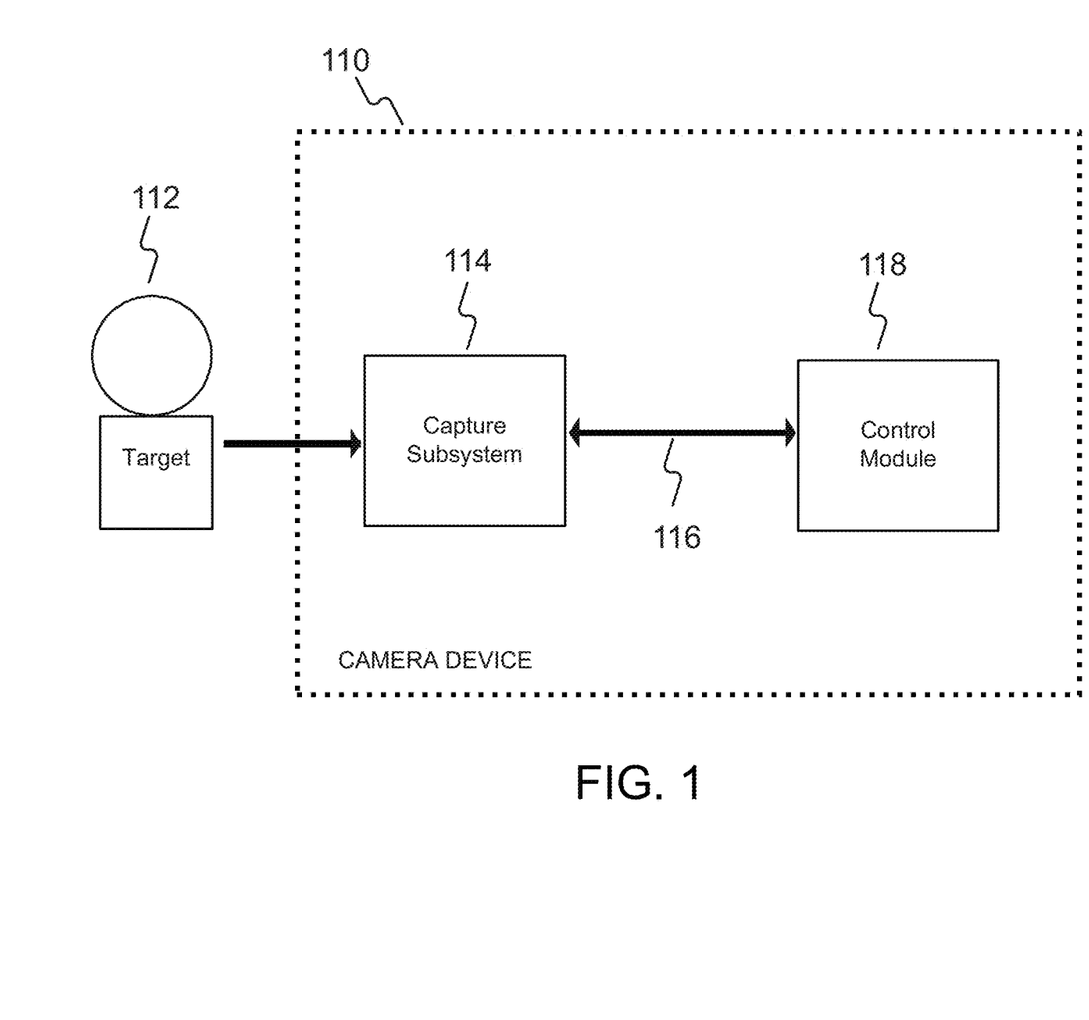
FIG. 1 is a block diagram for one embodiment of a camera device, in accordance with the present invention.

Referring now to FIG. 1, a block diagram for one embodiment of a camera device 110 is shown, in accordance with the present invention. In the FIG. 1 embodiment, camera device 110 may include, but is not limited to, a capture subsystem 114, a system bus 116, and a control module 118. In the FIG. 1 embodiment, capture subsystem 114 may be optically coupled to a photographic target 112, and may also be electrically coupled via system bus 116 to control module 118.

In alternate embodiments, camera device 110 may readily include various other components in addition to, or instead of, those components discussed in conjunction with the FIG. 1 embodiment. In addition, in certain embodiments, the present invention may alternately be embodied in any appropriate type of electronic device other than the camera device 110 of FIG. 1. For example, camera device 110 may alternately be implemented as an imaging device, a computer device, or a consumer electronics device.

In the FIG. 1 embodiment, once capture subsystem 114 of camera 110 is automatically focused on target 112, a camera user may request camera device 110 to capture image data corresponding to target 112. Control module 118 then may preferably instruct capture subsystem 114 via system bus 116 to capture image data representing target 112. The captured image data may then be transferred over system bus 116 to control module 118, which may responsively perform various processes and functions with the image data. System bus 116 may also bi-directionally pass various status and control signals between capture subsystem 114 and control module 118.

Figure 2:
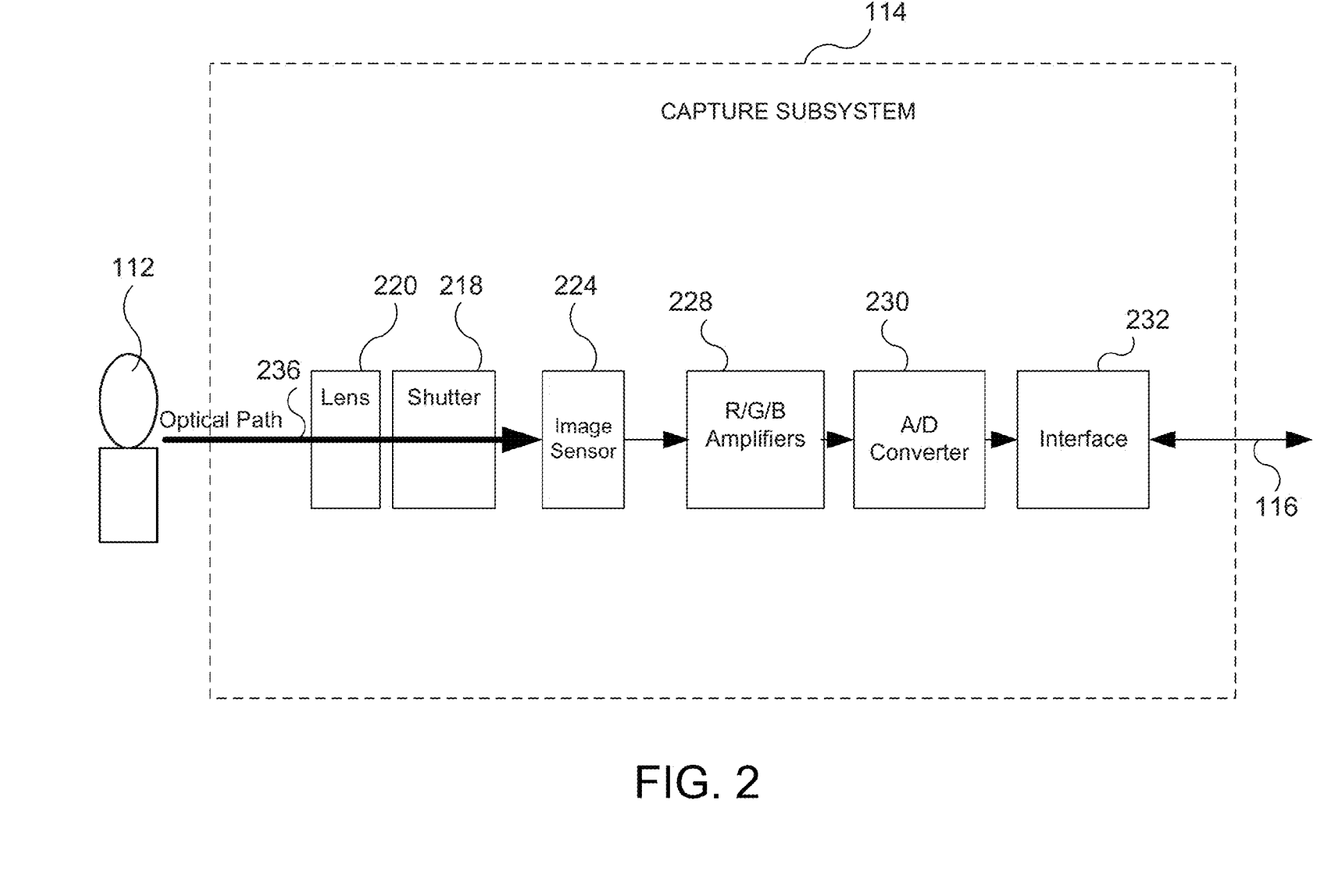
FIG. 2 is a block diagram for one embodiment of the capture subsystem of FIG. 1, in accordance with the present invention.

Referring now to FIG. 2, a block diagram for one embodiment of the FIG. 1 capture subsystem 114 is shown, in accordance with the present invention. In the FIG. 2 embodiment, capture subsystem 114 preferably comprises, but is not limited to, a shutter 218, a lens 220, an image sensor 224, red, green, and blue (R/G/B) amplifiers 228, an analog-to-digital (A/D) converter 230, and an interface 232. In alternate embodiments, capture subsystem 114 may readily include various other components in addition to, or instead of, those components discussed in conjunction with the FIG. 2 embodiment.

In the FIG. 2 embodiment, capture subsystem 114 may capture image data corresponding to target 112 via reflected light impacting image sensor 224 along optical path 236. Image sensor 224, which may preferably include a charged-coupled device (CCD), may responsively generate a set of image data representing the target 112. The image data may then be routed through amplifiers 228, A/D converter 230, and interface 232. From interface 232, the image data passes over system bus 116 to control module 118 for appropriate processing and storage. Other types of image capture sensors, such as CMOS or linear arrays are also contemplated for capturing image data in conjunction with the present invention. The utilization and functionality of camera 110 is further discussed below in conjunction with FIGS. 3-11.

Figure 3:
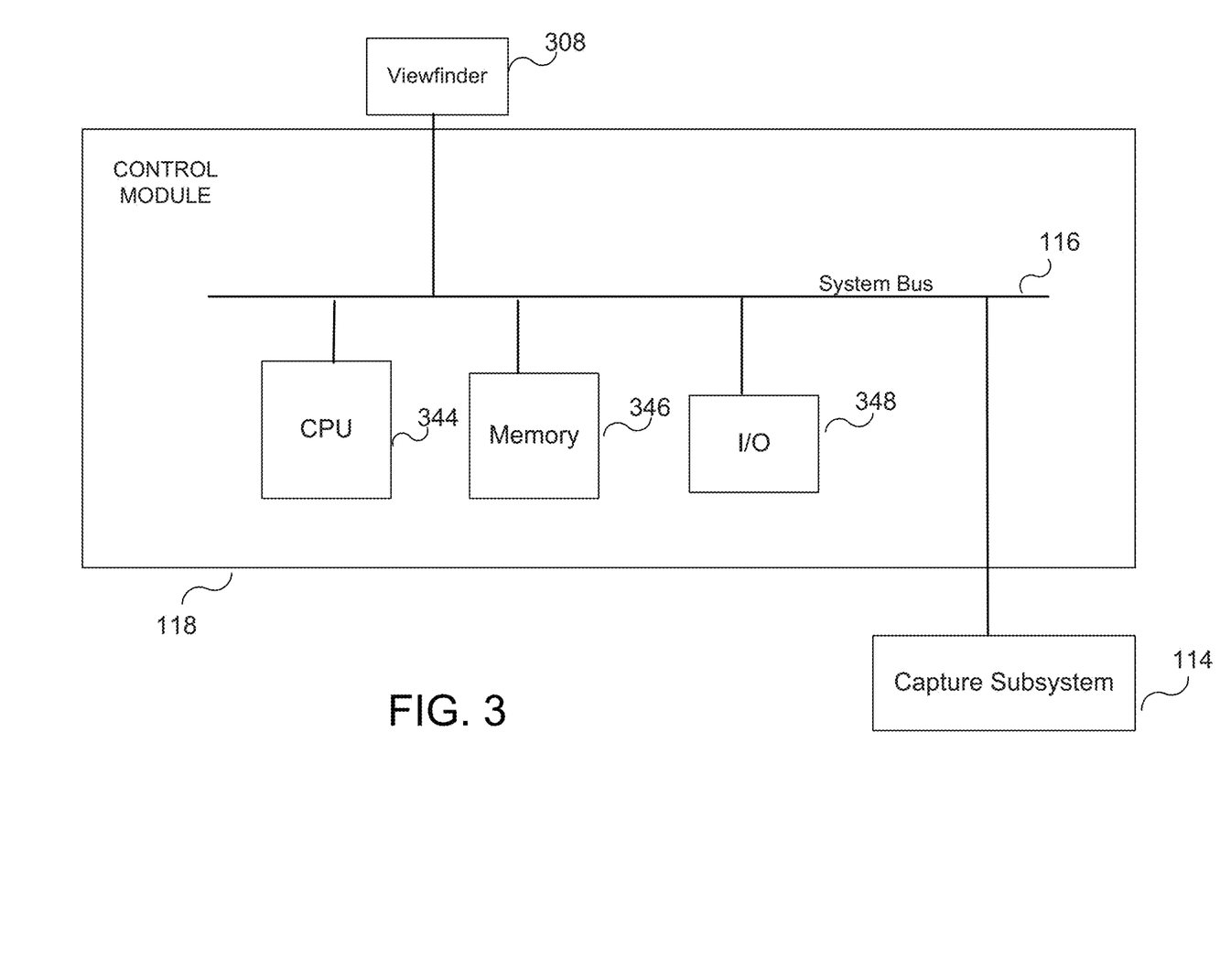
FIG. 3 is a block diagram for one embodiment of the control module of FIG. 1, in accordance with the present invention.

Referring now to FIG. 3, a block diagram for one embodiment of the FIG. 1 control module 118 is shown, in accordance with the present invention. In the FIG. 3 embodiment, control module 118 preferably includes, but is not limited to, a viewfinder 308, a central processing unit (CPU) 344, a memory 346, and one or more input/output interface(s) (I/O) 348. Viewfinder 308, CPU 344, memory 346, and I/O 348 preferably are each coupled to, and communicate, via common system bus 116 that also communicates with capture subsystem 114. In alternate embodiments, control module 118 may readily include various other components in addition to, or instead of, those components discussed in conjunction with the FIG. 3 embodiment.

In the FIG. 3 embodiment, CPU 344 may be implemented to include any appropriate microprocessor device. Alternately, CPU 344 may be implemented using any other appropriate technology. For example, CPU 344 may be implemented to include certain application-specific integrated circuits (ASICs) or other appropriate electronic devices. Memory 346 may be implemented as one or more appropriate storage devices, including, but not limited to, read-only memory, random-access memory, and various types of non-volatile memory, such as floppy disc devices, hard disc devices, or flash memory. I/O 348 may provide one or more effective interfaces for facilitating bi-directional communications between camera device 110 and any external entity, including a system user or another electronic device. I/O 348 may be implemented using any appropriate input and/or output devices. The operation and utilization of control module 118 are further discussed below in conjunction with FIGS. 4 through 11.

Figure 4:
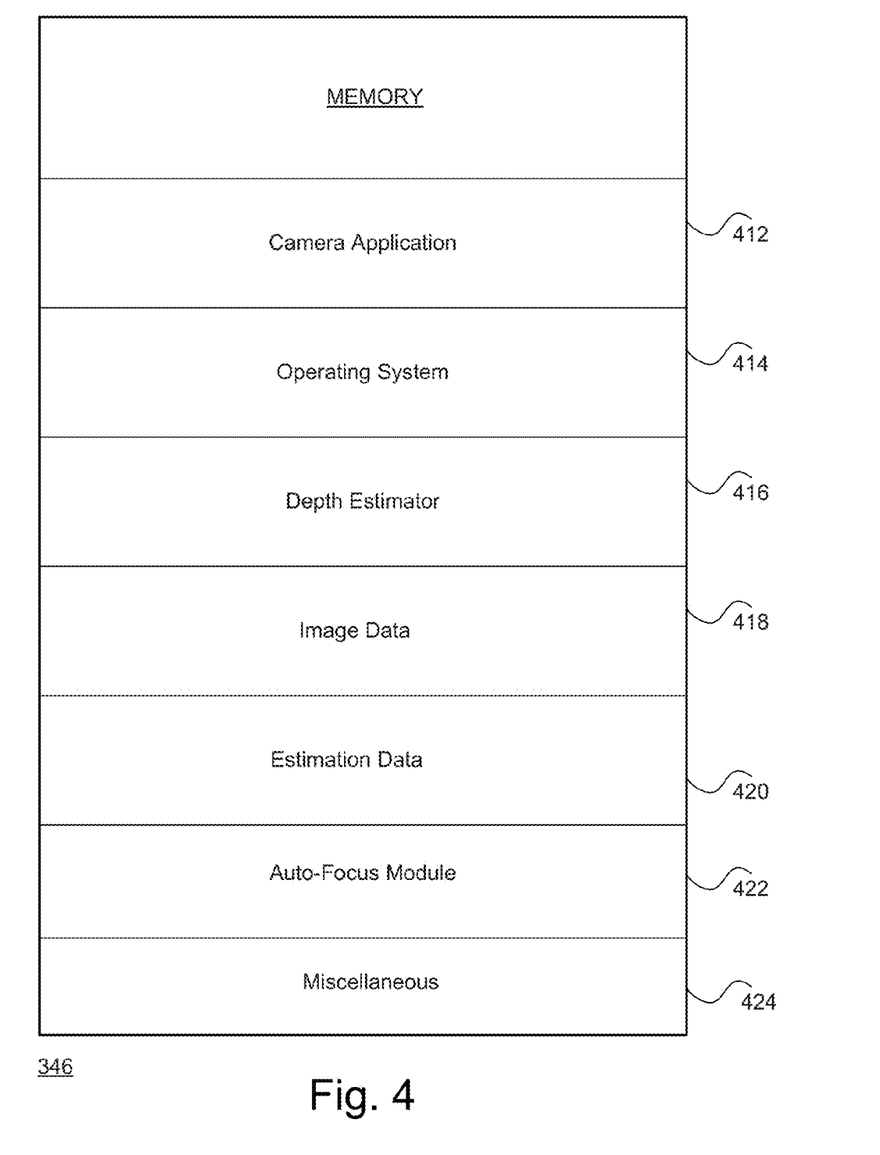
FIG. 4 is a block diagram for one embodiment of the memory of FIG. 3, in accordance with the present invention.

Referring now to FIG. 4, a block diagram for one embodiment of the FIG. 3 memory 346 is shown, in accordance with the present invention. In the FIG. 4 embodiment, memory 346 may include, but is not limited to, a camera application 412, an operating system 414, a depth estimator 416, image data 418, estimation data 420, an auto-focus module 422, and miscellaneous information 424. In alternate embodiments, memory 346 may include various other components in addition to, or instead of, those components discussed in conjunction with the FIG. 4 embodiment.

In the FIG. 4 embodiment, camera application 412 may include program instructions that are preferably executed by CPU 344 (FIG. 3) to perform various functions and operations for camera device 110. The particular nature and functionality of camera application 412 preferably varies depending upon factors such as the type and particular use of the corresponding camera device 110.

In the FIG. 4 embodiment, operating system 414 preferably controls and coordinates low-level functionality of camera device 110. In accordance with the present invention, depth estimator 416 may control and coordinate a depth estimation procedure to facilitate automatic focus features in camera 110. In the FIG. 4 embodiment, image data 418 may include one or more images of a photographic target 112 captured by camera device 110. Estimation data 420 may include any types of information or data for performing a depth estimation procedure. In the FIG. 4 embodiment, autofocus module 422 may utilize the results of the depth estimation procedure to perform an auto-focus procedure for camera device 110. Miscellaneous information 424 includes any other appropriate information for the operation of camera 110. Additional details regarding the operation of depth estimator 416 are further discussed below in conjunction with FIGS. 5-11.

Figure 5:
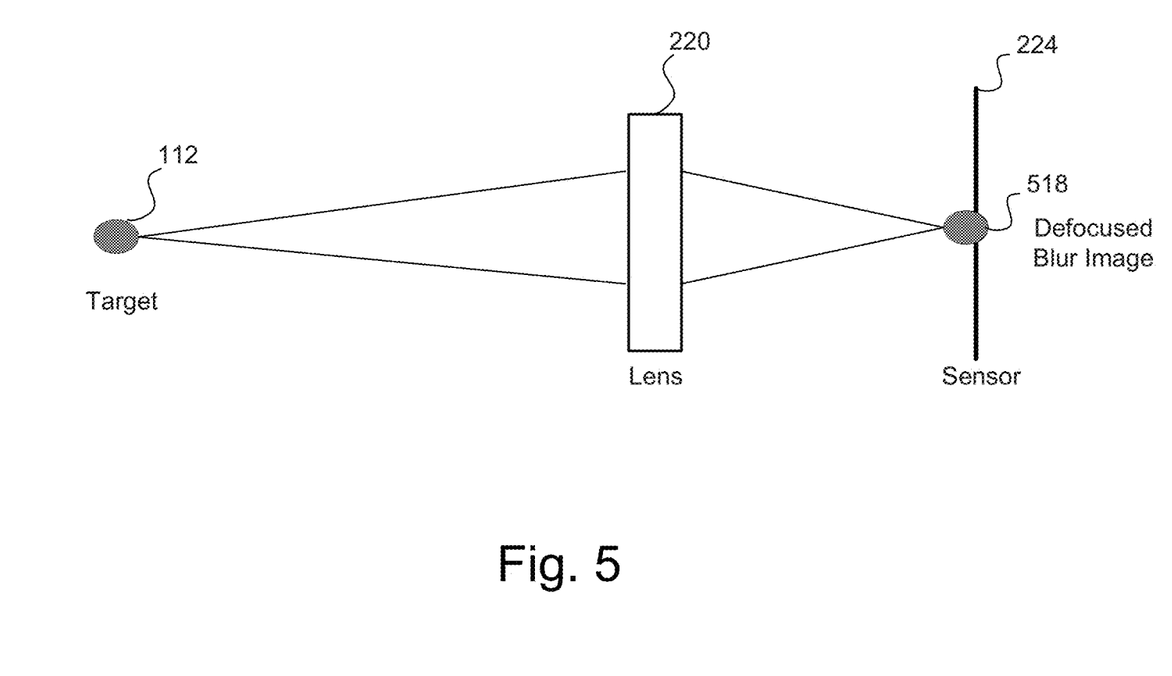
FIG. 5 is a diagram of one exemplary embodiment for capturing a defocused blur image, in accordance with the present invention.

Referring now to FIG. 5, a diagram of one exemplary embodiment for capturing a defocused blur image 518 is shown, in accordance with the present invention. The FIG. 5 embodiment is provided for purposes of illustration, and in alternate embodiments, the present invention may utilize various other configurations and elements to capture defocused blur images 518.

In the FIG. 5 embodiment, a sensor 224 of a camera 110 (see FIG. 2) may capture a defocused blur image 518 of a photographic target or scene 112 for performing a depth estimation procedure. The defocused blur image 518 may be created by adjusting lens 220 to a position other than the correct in-focus lens position that depends upon the relative positions of target 112, lens 220, and sensor 224.

In one embodiment, two different defocused blur images 518 may be compared to derive a depth estimation. A blur difference may be calculated for two blur images 518 that are one depth-of-field away from each other. A slope of a known matching curve and the blur difference can be utilized to determine the depth of a given target 112. The generation and utilization of defocused blur images for depth estimation are further discussed below in conjunction with FIGS. 6-11.

Figure 6:
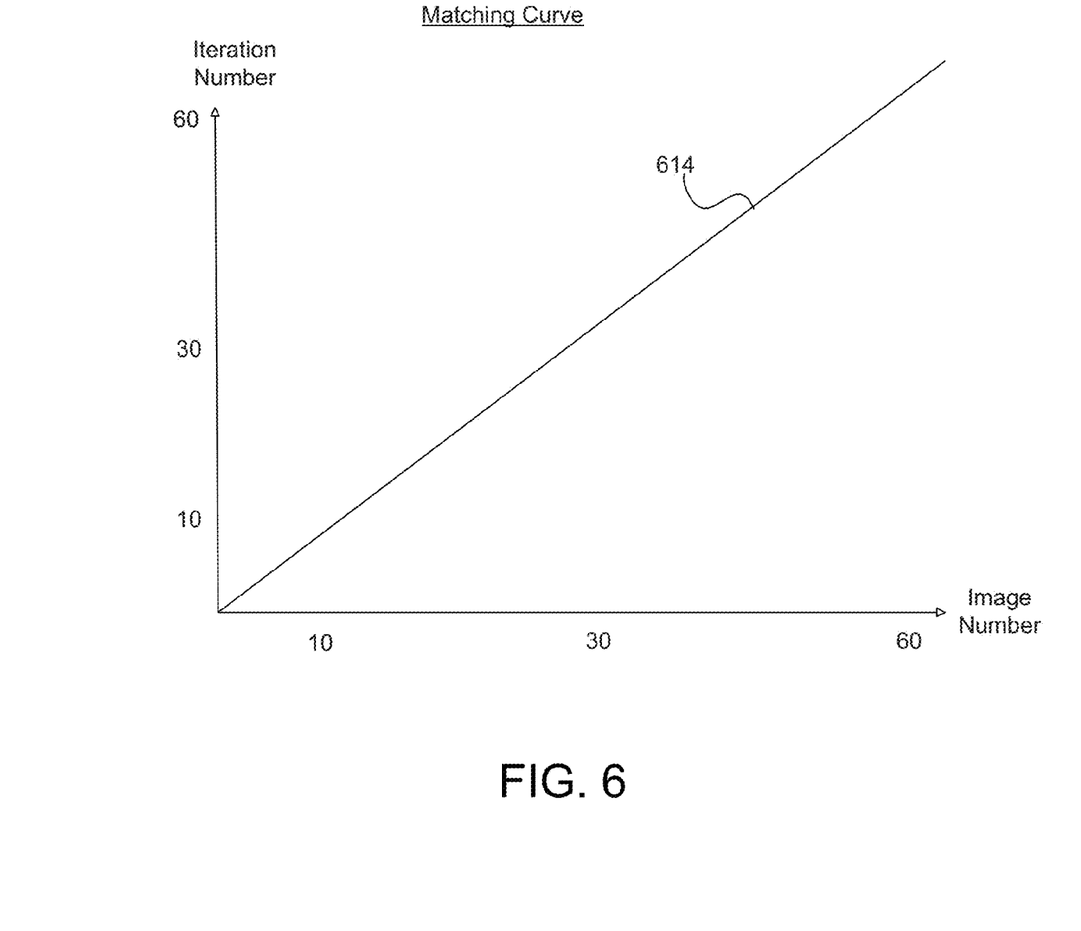
FIG. 6 is a graph of an exemplary matching curve, in accordance with one embodiment of the present invention.

Referring now to FIG. 6, a graph of an exemplary matching curve 714 is shown, in accordance with one embodiment of the present invention. The FIG. 6 embodiment is presented for purposes of illustration, and in alternate embodiments, the present invention may be implemented to utilize matching curves with configurations and parameters in addition to, or instead of, certain of those configurations and parameters discussed in conjunction with the FIG. 6 embodiment.

In certain embodiments, a blur image1 and a more-defocused blur image2 may be captured, the sharper image1 may be convolved with a Gaussian kernel (for example, a 3×3 Gaussian matrix with small variance) to produce a convolved image1. The convolved image1 is compared to blur image2. This process is repeated until the two blur image match. The number of iterations may then be graphed against depth-of-field (or image numbers in increments of one DOF) to produce a blur matching curve that can be used to estimate the distance from any out-of-focus position to the in-focus position. Additional details regarding the foregoing depth estimation technique are further discussed in U.S. Pat. No. 8,045,046 to Li et al., which is hereby incorporated by reference.

Figure 7:
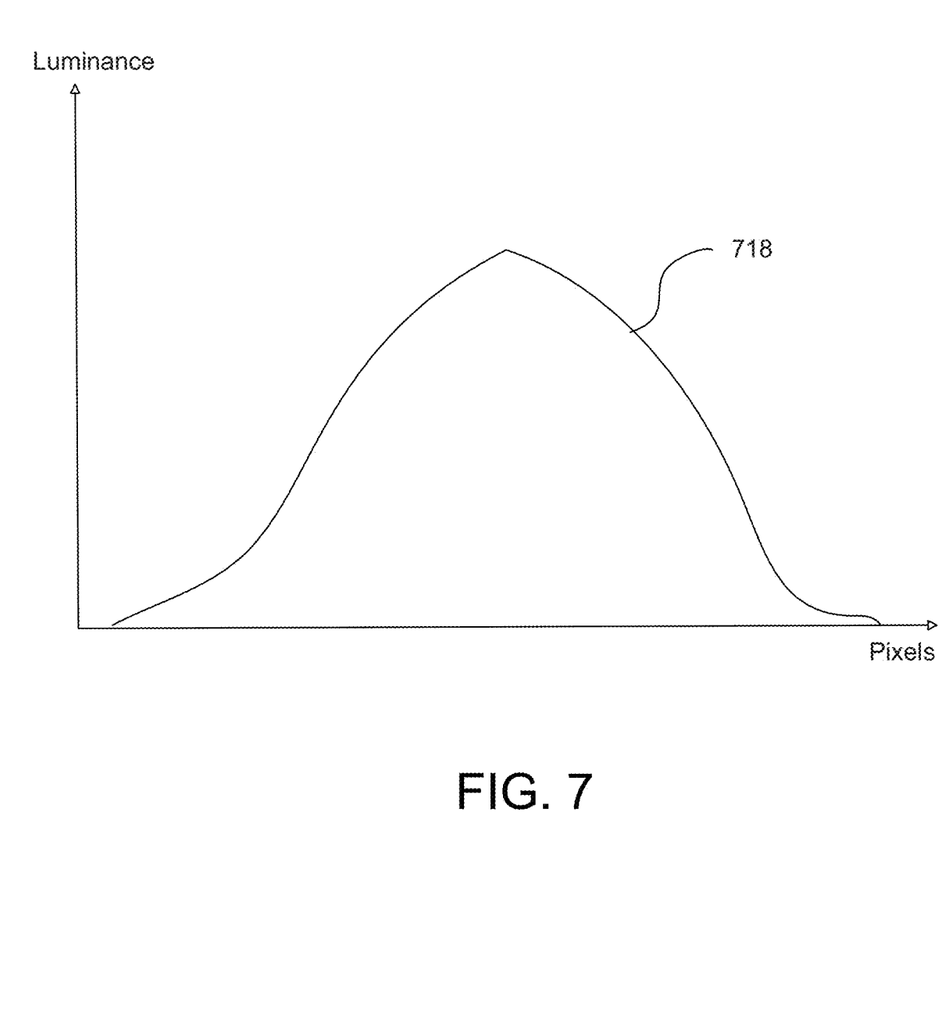
FIG. 7 is a graph of an exemplary Gaussian model of a blur image, in accordance with one embodiment of the present invention.

Referring now to FIG. 7, a graph of an exemplary Gaussian model 718 of a blur image 518 (FIG. 5) is shown, in accordance with one embodiment of the present invention. The FIG. 7 embodiment is presented for purposes of illustration, and in alternate embodiments, the present invention may utilize Gaussian models with elements and configurations other than those discussed in conjunction with the FIG. 7 embodiment.

In the FIG. 7 embodiment, luminance is represented on a vertical axis and pixels are represented on a horizontal axis. In the FIG. 7 graph, Gaussian model 718 displays a typical bell-curve shape. However, not all blur images 518 are best represented by utilizing a Gaussian model 718. Depending upon image characteristics of a photographic target or scene, certain non-Gaussian models may be more effective. One example of a non-Gaussian model is further discussed below in conjunction with FIGS. 8-11.

Figure 8:
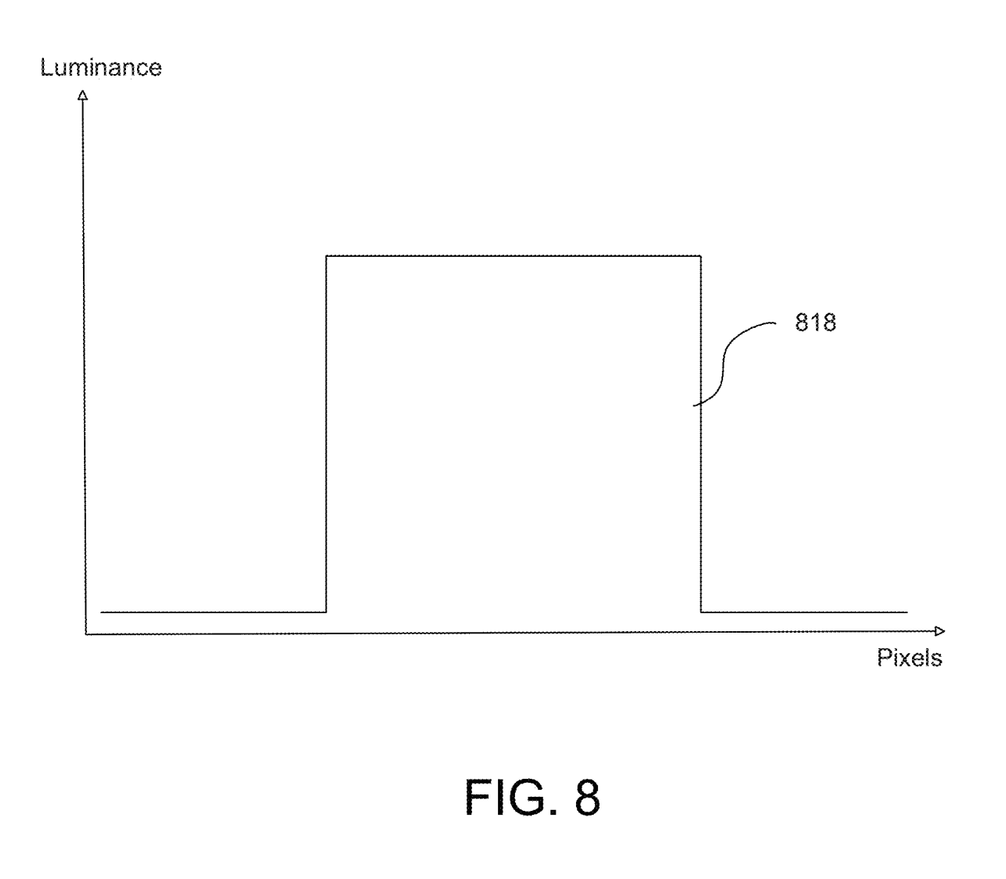
FIG. 8 is a graph of an exemplary pillbox model of a blur image, in accordance with one embodiment of the present invention.

Referring now to FIG. 8, a graph of an exemplary pillbox model of a blur image 518 shown, in accordance with one embodiment of the present invention. The FIG. 8 embodiment is presented for purposes of illustration, and in alternate embodiments, the present invention may utilize pillbox models with elements and configurations other than those discussed in conjunction with the FIG. 8 embodiment.

In the FIG. 8 embodiment, luminance is represented on a vertical axis and pixels are represented on a horizontal axis. In the FIG. 8 graph, pillbox model 818 displays a typical sharp-edged shape. Depending upon image characteristics of a photographic target or scene, certain non-Gaussian models, such as pillbox model 818, may be more effective. For example, a pillbox model 818 may be better for a dark night scene that includes a very bright light source such as a candle.

However, certain of the depth estimation techniques discussed above fail to perform satisfactorily when used in conjunction with pillbox blur images. In accordance with the present invention, a Gaussianization procedure is therefore utilized to advantageously transform the pillbox blur image into a Gaussian format that may then be successfully be utilized for depth estimation procedures, as discussed above.

The Gaussianization procedure may be performed in any effective manner. For example, a pillbox blur image may be convolved with a Gaussianization kernel to produce a Gaussianized blur image. The Gaussianization kernel may be implemented and utilized in any appropriate manner. For example, the Gaussianization kernel may be a Gaussian function or a more general blur function with a limited mean and variance.

In certain embodiments, the Gaussianization kernel may be implemented as a box function with a square matrix in which all matrix values are the same value, and the sum of all these matrix values equals 1. The Gaussianization kernel may also be implemented as a two-dimensional uniform box function which may be represented as a tensor product of two one-dimensional functions in accordance with the following formula:

$$f(m,n) = \begin{cases} 1/(2M+1)(2N+1), & |m| \le M, |n| \le N \\ 0, & \text{elsewhere} \end{cases}$$

where m and n are pixel coordinates, and where M and N are respective dimensions of the kernel matrix. In one alternate embodiment, multiple stages of Gaussianization may be utilized to improve efficiency. For example, a smaller gaussianization kernel may be utilized to perform the Gaussianization procedure in smaller segments. This technique may improve computational speed for images that do not require much Gaussianization. Additional details regarding the Gaussianization procedure are further discussed below in conjunction with FIGS. 9-11.

Figure 9A:
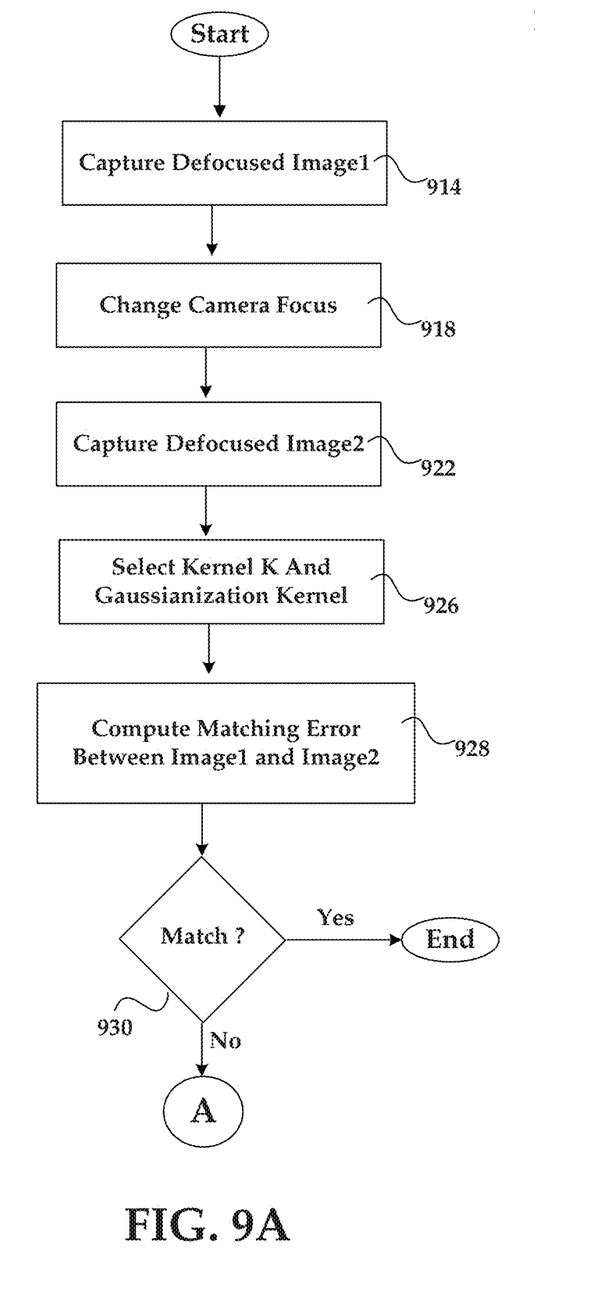
FIGS. 9A-9C are a flowchart of method steps for performing a depth estimation procedure with pillbox blur images, in accordance with one embodiment of the present invention.
Figure 9B:
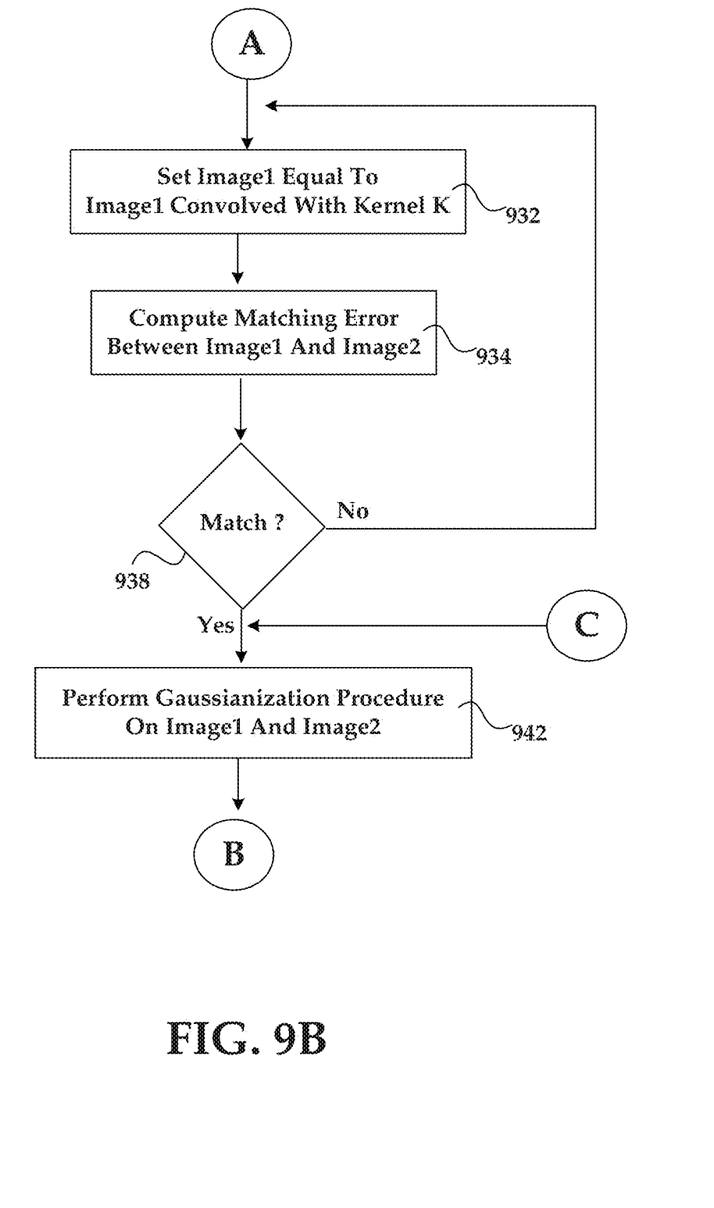
Figure 9C:
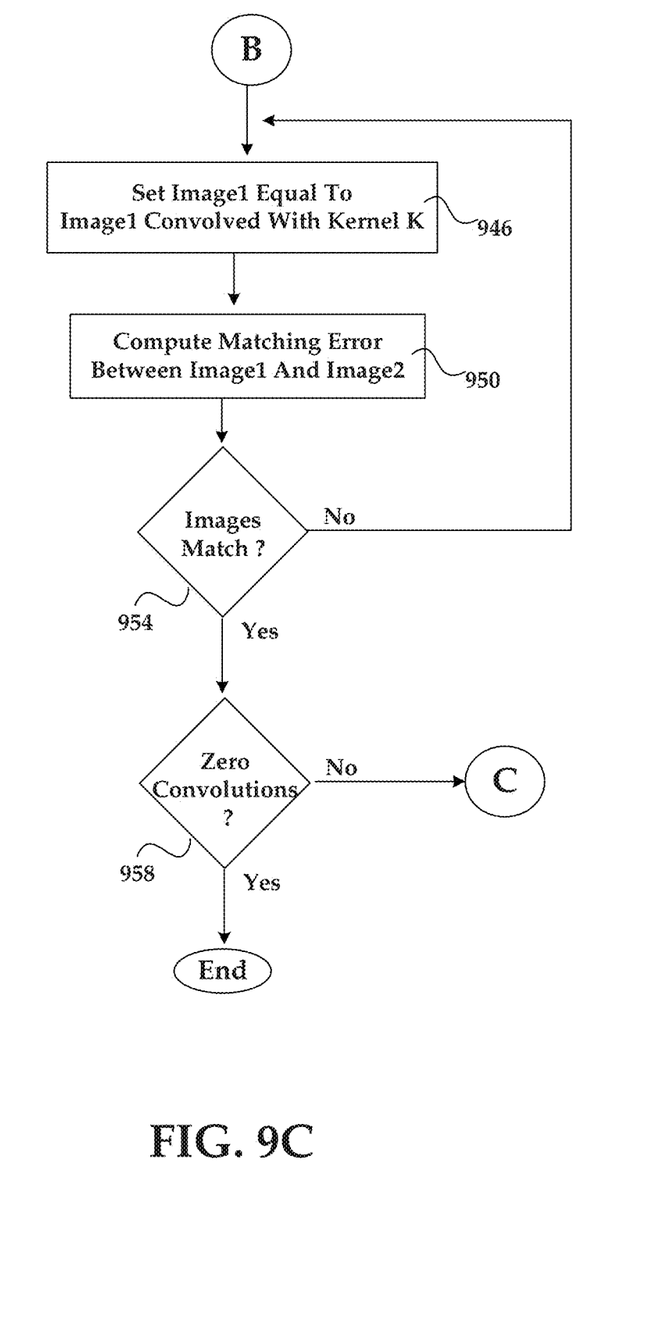

Referring now to FIGS. 9A-9C, a flowchart of method steps for performing a depth estimation procedure with pillbox images is shown, in accordance with one embodiment of the present invention. The FIG. 9 embodiment is presented for purposes of illustration, and in alternate embodiments, the present invention may readily utilize various steps and sequences other than those steps and sequences discussed in conjunction with the FIG. 9 embodiment.

In the FIG. 9A embodiment, in step 914, camera 110 captures a defocused pillbox image1. In step 918, the focus setting of camera 110 is changed. For example, in the FIG. 9A embodiment, the focus setting may be adjusted to decrease the focus of camera 110 by one depth-of-field. In step 922, camera 110 captures a defocused pillbox image2 that is more blurry (out of focus) than previously captured pillbox image1.

In step 926, a depth estimator 416 or other appropriate entity selects an appropriate kernel K for performing a convolution procedure. The kernel K may be configured in any appropriate manner. For example, in certain embodiments, kernel K may be configured as a 3-by-3 Gaussian kernel with a small variance. In step 926, depth estimator 416 also selects an appropriate Gaussianization kernel for performing a Gaussianization procedure in accordance with the present invention.

As discussed above, the Gaussianization kernel may be implemented and utilized in any appropriate manner. For example, the Gaussianization kernel may be a Gaussian function or a more general blur function with a limited mean and variance. In step 928, depth estimator 416 computes the matching error between image1 and image2, and in step 930, depth estimator 416 determines whether the images match. If the images match, then the FIG. 9 process may terminate. However, if the images do not match, then the FIG. 9A process advances to step 932 of FIG. 9B through connecting letter "A."

In step 932, depth estimator 416 performs a convolution procedure to create a new current image1 that is equal to the immediately-preceding image1 convolved with the selected kernel K. In step 934, depth estimator 416 computes the matching error between the current image1 and image2. In step 938, depth estimator 416 determines whether current image1 and image2 match. If the two images do not match, then the FIG. 9 process returns to step 932 to perform additional iterations.

However, if image1 and image2 match in step 938, then in step 942, depth estimator 416 performs a Gaussianization procedure on both the current image1 and image2 by utilizing the previously-selected Gaussianization kernel to convert the non-Gaussian blur images into corresponding Gaussian blur images. In particular, depth estimator 416 performs a convolution procedure to create a new current image1 that is equal to the immediately-preceding image1 convolved with the selected Gaussianization kernel. In addition, depth estimator 416 performs a convolution procedure to create a new current image2 that is equal to the immediately-preceding image2 convolved with the selected Gaussianization kernel. In the FIG. 9B embodiment, the Gaussianization kernel may be implemented with a small variance value. The FIG. 9B process then advances to step 946 of FIG. 9C through connecting letter "B."

In step 946, depth estimator 416 performs a convolution procedure to create a new current image1 that is equal to the immediately-preceding image1 convolved with the selected kernel K. In step 950, depth estimator 416 computes the matching error between the current image1 and current image2. In step 954, depth estimator 416 determines whether current image1 and current image2 match. If the two images do not match, then the FIG. 9 process returns to step 946 to perform additional iterations. However, if image1 and image2 match in step 938, then in step 958, depth estimator 416 determines how many convolutions have been performed in foregoing step 946. If there were non-zero convolutions, then the FIG. 9C process returns to step 942 of FIG. 9B through connecting letter "C" to perform one or more additional Gaussianization procedures. However, is there were zero convolutions, then the FIG. 9 process may terminate. The blur difference between image1 and image2 is then given by the total number of convolutions with kernel K performed at 932 and 946. The present invention therefore provides an improved system and method for performing a depth estimation procedure by utilizing pillbox blur images.

Figure 10:
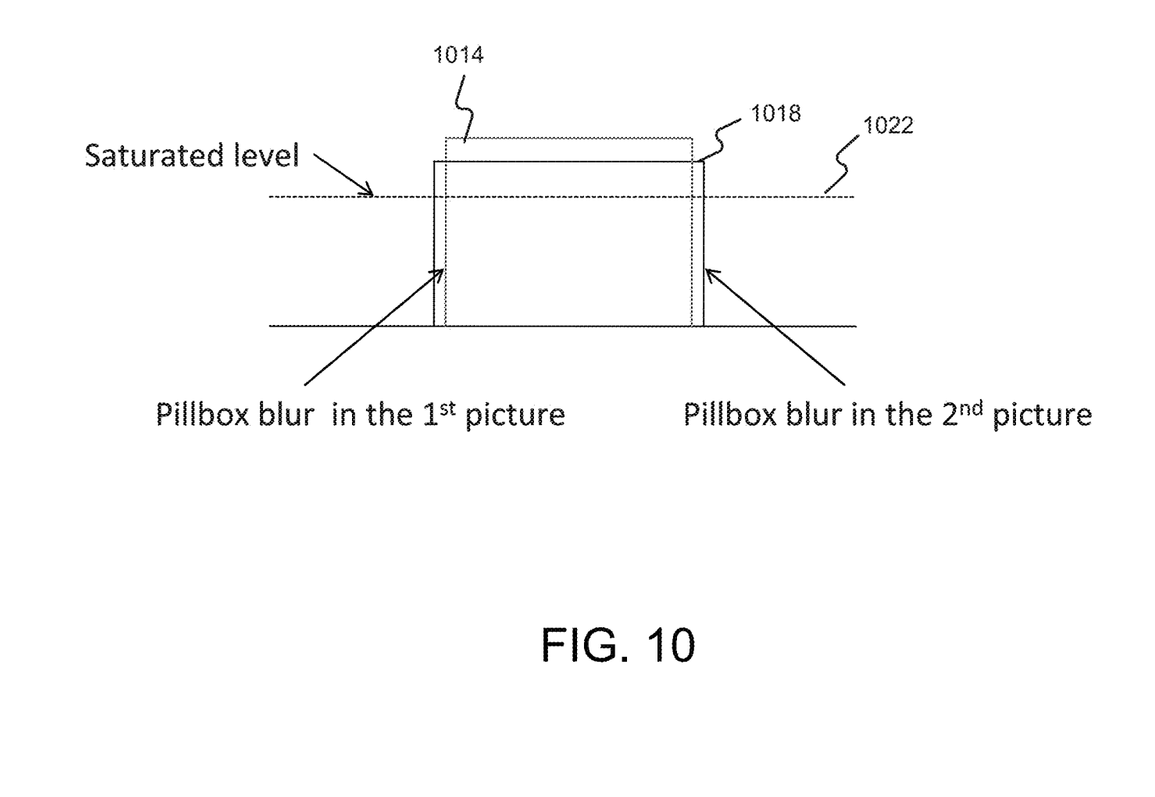
FIG. 10 is a diagram of two saturated pillbox images, in accordance with one exemplary embodiment of the present invention.

Referring now to FIG. 10, a diagram of two saturated pillbox images 1014 and 1018 is shown, in accordance with one embodiment of the present invention. The FIG. 10 embodiment is presented for purposes of illustration, and in alternate embodiments, the present invention may utilize pillbox images with elements and configurations other than those discussed in conjunction with the FIG. 10 embodiment.

In the FIG. 10 embodiment, waveforms for a first pillbox image 1014 (for example, image1 of FIG. 9) and a second pillbox image 1018 (for example, image2 of FIG. 9) are shown superimposed. Since image 1014 is more focused, its waveform shape is narrower and taller than the waveform of image 1018. However, like other types of blur images, pillbox blur images should preserve the same amount of energy/total luminance.

In the FIG. 10 embodiment, the pillbox images are clipped/saturated because they both exceed a saturation threshold level 1022. If the pillbox blur images are saturated/clipped, then there is a difference between the total luminance of two pictures. In general, blur matching techniques (such as the Gaussianization procedure discussed in FIG. 9) do not work well for saturated pillbox blur images because the total luminance is not preserved. Therefore, in accordance with certain embodiments of the present invention, a fillbox technique may be utilized before performing any blur matching techniques. One such fillbox embodiment is discussed below in conjunction with FIG. 11.

Figure 11:
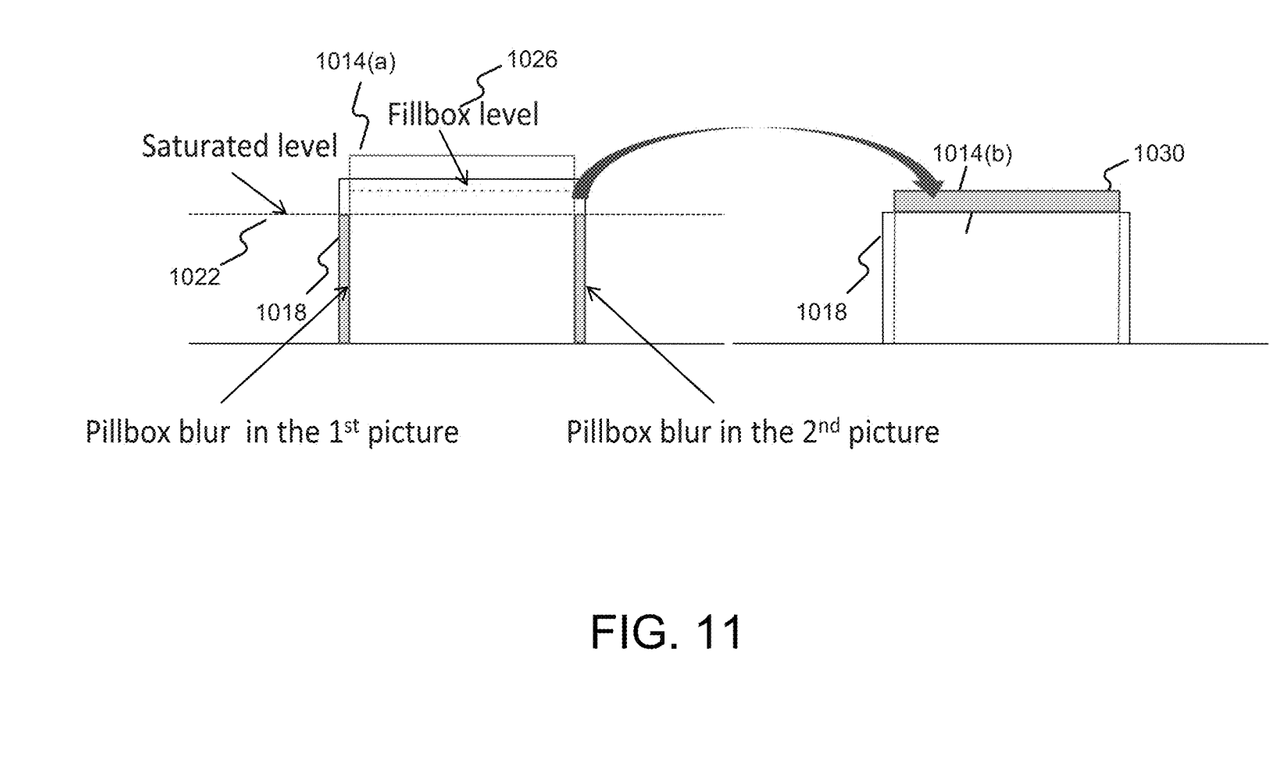
FIG. 11 is a diagram illustrating a fillbox technique for the saturated pillbox images of FIG. 10, in accordance with one exemplary embodiment of the present invention.

Referring now to FIG. 11, a diagram illustrating a fillbox technique for handling the FIG. 10 saturated pillbox images is shown, in accordance with one embodiment of the present invention. The FIG. 11 embodiment is presented for purposes of illustration, and in alternate embodiments, the present invention may utilize fillbox techniques with elements, steps, and configurations other than those discussed in conjunction with the FIG. 11 embodiment.

On the left side of the FIG. 11 diagram, the pillbox images 1018 and 1014(a) are clipped/saturated because they both exceed a saturation threshold level 1022. If the pillbox blur images are saturated/clipped, then there is a difference between the total luminance of two pictures. Since image 1014(a) is taller, it has more luminance removed by the saturation threshold 1022. As shown on the right side of the FIG. 11 diagram, the fillbox procedure may advantageously be utilized to equalize the respective luminance totals of images 1018 and 1014(a) by increasing the luminance of image 1014(a) by a luminance fill amount 1030 to thereby produce a new equalized image 1014(b).

In the FIG. 11 embodiment, the depth estimator 416 (FIG. 4) or other appropriate entity initially calculates the total luminance of the saturated pillbox in each picture 1014(a) and 1018. Depth estimator 416 determines the difference of the total luminance between the two pictures 1014(a) and 1018. Then for the pillbox blur image 1014(a) with smaller total luminance, depth estimator adds the average difference of the total luminance to each saturated pixel of the pillbox image 1014(*a*) to produce equalized image 1014(*b*). This fillbox technique may be characterized as filling the smaller pillbox image 1014(*a*) until the two images are equal in volume/total luminance. After completing the foregoing fillbox procedure, depth estimator 416 may treat the pillbox blur images 1014(*b*) and 1018 as non-saturated pillboxes, and may perform blur matching with the Gaussianization procedure discussed above in conjunction with FIG. 9.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for performing a depth estimation procedure, comprising:
   a sensor device for capturing pillbox blur images of a photographic target; and
   a depth estimator for performing a Gaussianization procedure with a Gaussianization kernel that transforms said pillbox blur images into Gaussian blur images, said Gaussianization kernel being implemented as a tensor product of two one-dimensional functions, said depth estimator then utilizing said Gaussian blur images for performing said depth estimation procedure.

2. The system of claim 1 wherein said depth estimator performs said Gaussianization procedure by convolving said pillbox images with said Gaussianization kernel to produce said Gaussian blur images.

3. The system of claim 2 wherein said Gaussianization kernel is implemented as a box function with a square matrix in which all matrix values are an identical value, and the sum of all these matrix values equals 1.

4. A system for performing a depth estimation procedure, comprising:
   a sensor device for capturing pillbox blur images of a photographic target; and
   a depth estimator for performing a Gaussianization procedure that transforms said pillbox blur images into Gaussian blur images, said depth estimator then utilizing said Gaussian blur images for performing said depth estimation procedure, said depth estimator performing said Gaussianization procedure by convolving said pillbox images with a Gaussianization kernel to produce said Gaussian blur images, said Gaussianization kernel being implemented as a two-dimensional uniform box function which is represented as a tensor product of two one-dimensional functions in accordance with a formula:

$$f(m, n) = \begin{cases} 1/(2M+1)(2N+1), & |m| \leq M, |n| \leq N \\ 0, & \text{elsewhere} \end{cases}$$

where m and n are pixel coordinates, and where M and N are respective dimensions of a matrix of said Gaussianization kernel.

5. The system of claim 1 wherein said depth estimator determines that said pillbox blur images are clipped by a saturation threshold level, said depth estimator then performing a fillbox procedure to equalize energy totals for said pillbox blur images before performing said Gaussianization procedure.

6. The system of claim 5 wherein said depth estimator performs said fillbox procedure by initially calculating first total luminance of a first image and a second total luminance of a second image, said depth estimator determines a luminance difference between said first total luminance and said second total luminance.

7. The system of claim 6 wherein said depth estimator completes said fillbox procedure by adding said luminance difference to a smaller one of said pillbox blur images that has a smaller total luminance so that said energy totals of said first image and said second image are equalized.

8. The system of claim 1 wherein said sensor device and said depth generator are implemented in an electronic camera device that utilizes one or more depth values from said depth estimation procedure to perform an automatic focusing procedure.

9. The system of claim 8 wherein said sensor device captures an image 1 corresponding to a photographic target by utilizing a first defocused lens position, said camera device then being adjusted to a second defocused lens position that is different than said first defocused lens position, said sensor device capturing an image2 corresponding to said photographic target by utilizing said second defocused lens position, said second defocused lens position being less focused than said first defocused lens position.

10. The system of claim 9 wherein said depth estimator selects a kernel K and a Gaussianization kernel.

11. The system of claim 10 wherein said kernel K is implemented as a Gaussian 3-by-3 matrix with a small variance.

12. The system of claim 10 wherein said Gaussianization kernel is implemented as a box function with a square matrix in which all matrix values are an identical value, and the sum of all these matrix values equals 1.

13. The system of claim 10 wherein said depth estimator convolves said image1 with said kernel K in a first convolution procedure to produce a current convolved image1.

14. The system of claim 13 wherein said depth estimator compares said current convolved image1 with said image2 in a first blur image matching procedure, said depth estimator performing additional iterations of said convolution procedure until a first matching result is reached.

15. The system of claim 14 wherein said depth estimator utilizes a Gaussianization kernel to perform said Gaussianization procedure upon said first current convolved image1 and said image2 to produce a Gaussian image1 and a Gaussian image2.

16. The system of claim 15 wherein said depth estimator convolves said Gaussian image1 with said kernel K in a said second convolution procedure to produce a current convolved Gaussian image1.

17. The system of claim 16 wherein said depth estimator compares said current convolved Gaussian image1 with said Gaussian image2 in a second blur image matching procedure, said depth estimator performing additional iterations of said second convolution procedure until a second matching result is reached, said depth estimator generating a total iteration number based upon said additional iterations.

18. The system of claim 17 wherein said depth estimator utilizes said total iteration number to generate a matching curve for said depth estimation procedure, said depth estimator utilizes said matching curve to generate a depth value corresponding to said photographic target.

19. The system of claim 18 wherein said depth estimator performs a multi-stage Gaussianization procedure that processes segments of said pillbox blur images with a reduced-size Gaussianization kernel.

20. A method for performing a depth estimation procedure by performing the steps of:
provoking a sensor device for capturing pillbox blur images of a photographic target; and
utilizing a depth estimator for performing a Gaussianization procedure with a Gaussianization kernel that transforms said pillbox blur images into Gaussian blur images, said Gaussianization kernel being implemented as a tensor product of two one-dimensional functions, said depth estimator then utilizing said Gaussian blur images for performing said depth estimation procedure.

\* \* \* \* \*